Patented May 23, 1944

2,349,342

UNITED STATES PATENT OFFICE 2,349,342

PROCESS OF MAKING SOLID FUEL BRIQUETTES

John A. Erickson, Jackson, Mich.

No Drawing. Application July 11, 1941,
Serial No. 402,015

7 Claims. (Cl. 44—15)

This invention relates to fuel briquettes and more particularly to a method of manufacturing fuel briquettes employing a starch base binder. This application is a continuation in part of my copending application Serial No. 272,490, filed May 8, 1939.

In the production of fuel briquettes, the early process was to bind together relatively fine particles of fuel such as coal, or coke, with hydrocarbons such as asphalts, pitches, tars, and the like. Such briquettes were not satisfactory for the reason that the binder employed resulted in an excess amount of smoke when burned. In order to avoid the smoke produced by these binders, vegetable binders have come into use, one of the most successful of which is starch.

One well known method of manufacturing briquettes comprises the combining together of a quantity of finely divided fuel with dry or freshly prepared starch in the presence of water and heat. The mixture is agitated and the starch is gelatinized, acting as a binder for the fuel particles. As soon as the mixture has been sufficiently agitated and the starch gelatinized, the mixture is formed into briquettes in a known manner. Prior practice as exemplified by the method aforesaid, is not satisfactory because the full adhesive qualities of the starch are not developed. The starch particles merely absorb many times their own volume of water with the result that before the briquettes will harden the large amount of excess water which has been absorbed must be evaporated. Another prior practice is to mix dry starch with the entire mass of coal for briquetting. In this case the entire mass of the fuel must be heated in order to heat the small percentage of starch mixed with the fuel. It will also be evident that the quality of the starch adhesive or binder cannot be determined before it is mixed with the fuel and that, therefore, the quality of the binder is dependent upon the good judgment of the machine operator who must judge from the appearance of the fuel and binder mixture as to whether or not the binder is in a good adhesive condition. While the method just described produces a satisfactory briquette, the cost is such that except in a few special cases the briquettes cannot compete in cost with natural fuels.

Still another process is disclosed in British Patent No. 9932 of 1900 to Tucker. In this process as the result of heating starch with water a binder having nine parts of water to one of starch is provided, the binder being gelatinous in character and the adhesive properties thereof not being fully developed. According to the present invention my binder has substantially less water than the starch will absorb upon heating the starch and water to the boiling point of water. My binder consists of a heavy, viscous, sticky fluid and the adhesive properties thereof are fully developed.

According to the present invention, the starch binder is prepared before it is mixed with the fuel. Specifically the invention comprises mixing with the starch a small quantity of water and an alkali, the result of which is to greatly increase the quality of the starch as an adhesive over the prior method of simply mixing starch with a large quantity of water. The use of heat is preferred to accelerate the reaction.

An object of the invention is to employ in the manufacture of fuel briquettes the step of preparing the binder prior to its mixture with the fuel.

Another object of the invention is to prepare a starch binder for use in fuel briquettes by adding an alkali and a small quantity of water to starch, and mixing the same to develop maximum adhesive qualities from the starch.

A further object of the invention is to prepare starch as a binder for briquettes by adding to it a relatively small quantity of water and treating the same with an alkali prior to mixing the binder with the fuel to be briquetted.

A still further object of the invention is to prepare a binder for briquettable fuel by combining starch and water in the presence of an alkali and heat to dissolve the starch and to provide a mixture containing substantial portions of starch, dextrine and dextrose.

These and other objects will be apparent from the following specification, wherein my invention is described in detail.

The present invention may be employed in the production of briquettes from substantially any of the briquettable fuels. In the case of semi-anthracite fines, the starch binder according to the present invention may be employed as the sole binding agent. However, it is contemplated that in manufacturing briquettes according to the present invention other materials not specifically related to the present invention may be employed when required. For instance, in the case of coke breeze and petroleum coke fines it is often necessary to add a low-volatile strongly coking coal due to the fact that the addition of such coal results in a briquette which does not so readily disintegrate in a fire. When employing anthracite fines the addition of a strongly coking coal is required to prevent disintegration during burning. In the present invention it is contemplated that fuel or briquettable fuel contemplates fuel in a briquettable state, either with or without the addition of a material necessary for practical reasons to make the fuel briquettable and bindable with a starch adhesive.

While any starch may be employed in the present invention, it is preferred that starch from grain and tubers, such as potatoes and yams be employed as these raw materials are readily available. Inasmuch as the process permits the use of cheap grain, old potatoes, or starch bearing roots and the like, which have become moldy or otherwise unfit for their usual consumption, this type of a source for starch is recommended. In obtaining starch from the materials herein specified, no refinement is necessary. In each case the whole source of starch may be finely divided in manners known in the art, and the resulting product used directly.

In practicing my invention, approximately equal parts by volume of starch in a dry finely divided form and water are mixed together and to the mixture is added an alkali. While the preferred ratio of starch to water is one to one the ratio may be about one to three without seriously affecting the adhesive properties of the final binder. Should too much water be used the final binder will be too thin for effective use as a binder. When the starch is in the form of crushed tubers or the like containing a relatively large amount of water, it is to be understood that the amount of water added must be based on the volume of dry starch, and that therefore in such cases it may not be necessary to add any additional water. In fact it may be necessary to remove some water. While any alkali may be employed, practical considerations require that the alkali actually used be sufficiently strong in order not to require too much of it to provide the results desired. Furthermore, economy requires that the alkali employed be relatively inexpensive. From these considerations, at the present time, sodium hydroxide, a caustic alkali, and sodium carbonate, a mild alkali, are the most desirable. However, it will be understood that other alkalis may be employed if desired without departing from the spirit and scope of the invention. These alkalis may be used either separately or in combination. In the case of sodium hydroxide, used alone, approximately 1% to 2% by weight of the dry starch should be added to the mixture of starch and water. In the case of other alkalis, the percentage thereof employed will depend on the strength of the alkali used. The entire mixture then is agitated vigorously at a temperature approximately from 220° F. to 350° F. for the period of time necessary to break down the starch to a heavy, viscous sticky fluid. In its preferred form the fluid binder is a heavy, viscous, sticky paste although it may be pumped. However, for certain uses the binder may be somewhat thinner. The usual time required is about 30 minutes or less. The temperature may be readily controlled by employing a steam jacketed pressure cooker and mixer.

The temperature and agitation plus the action of the alkali convert the starch into a binder of maximum adhesive properties. Ordinary starch is insoluble to any substantial extent in water due to the existence of an inert insoluble coating resembling cellulose in structure which surrounds each of the starch granules. The alkali has the effect of weakening this cellulose-like coating permitting the granules to burst to free the starch. The starch is then dissolved in the water of the mixture, the dissolving being assisted by the action of the heat and the agitation. At the same time the alkali reacts with a portion of the starch to produce dextrine and dextrose, both of which are water soluble and dissolve. While it is not known exactly the relative percentages of the starch, dextrine and dextrose in the resulting mixture, it is believed that approximately 15 to 20% of the starch remains in solution. It is known, however, that substantial percentages of dextrine and dextrose are obtained. The original starch is now reduced to a form where it has its maximum adhesive properties.

In actual practice it has been found by experiments that the binder reaches its point of maximum adhesiveness when it becomes substantially translucent and is in the form of a heavy, viscous, sticky fluid. At this point, the starch granules have completely dissolved and a part of the dissolved starch has been converted into dextrine and dextrose. The period of time required for preparing the binder, the temperature, the amount of agitation, and the percentage of caustic employed may all be varied as desired and as required so long as the resulting product is in the substantially translucent form described. While as explained above, the strength of the alkali employed will have a bearing on the percentage thereof required, the percentage required will also vary depending on the character of the starch employed, as well as on the temperature and time. Thus, for example, in using a temperature of from 220° F. to 350° F. as in the above example, but a greater percentage of sodium hydroxide than 2% by weight of the dry starch, the time for completely preparing the binder will be reduced. Conversely should the time be increased, while retaining the same temperature, the percentage or strength of alkali employed may be reduced. It should be observed that the temperature at which the mixture is maintained during the treatment should not be permitted to raise to such an extent as to caramelize the dextrine or dextrose, as the caramel is extremely inferior as a binding agent. Care should also be taken not to use too great a percentage of alkali as this will have a caramelizing effect on the starch.

During the initial period of heating and agitating the complete mixture, the mass of material becomes very thick due to the absorption of the water by the starch granules. In other words the amount of water used is less than the starch will absorb. The amount of water used may be described as less than that at which the starch will absorb upon being heated to above the boiling point of water. However, during the latter stages of the heating and agitating, the mixture is converted into a heavy, viscous, sticky fluid. This conversion is the result of the dissolving of the starch in the water following the action of the alkali on the coating surrounding each starch granule, and on the conversion of a portion of the starch into dextrine and dextrose. It will thus be apparent that there is obtained a highly efficient adhesive with a relatively small quantity of water. This result is far more satisfactory than the inefficient adhesive obtained embodying a relatively large quantity of water obtained when the starch is merely added to water and heated in the manner of the prior art.

When the heavy, viscous, sticky fluid mass of dissolved starch dextrine and dextrose has been prepared in the manner hereinabove set forth, it is mixed with fuel fines in suitable mixing apparatus. It is preferred that the briquette material be heated during mixing so that after the briquettes have been formed their heat will expedite drying. In the case of semi-anthracite fines the binder used should contain about ½ to 2% by weight of dry starch of the weight of the coal fines, depending on the nature of the coal and on the hardness desired in the finished briquette. It will be understood that other types of briquettable fuel may require a greater or lesser percentage of binder, depending on the nature of the fuel and on the adhesive characteristics of materials that may be added to them. When the fuel and binder have been mixed, the briquette mixture is formed into briquettes in any known or desirable manner.

Should the fuel fines, which are to be converted into briquettes, come directly from a washing plant or from storage where they have accumulated an excessively large amount of moisture, it may be necessary to remove some of the moisture by evaporation before or after mixing with the binder. If fuel to be briquetted is too dry it may be necessary to add water to the fuel. Thus a mixture of fuel fines and a binder may be reduced to a briquettable state by only mixing or it may be necessary to add or to remove water as well as to mix the ingredients.

When the molded briquettes are to be stored in a damp basement or in a place where they might accumulate mold, the fuel and binder mixture may have added to it some antiseptic ingredient such as copper sulphate or sodium fluoride in proportions well known in the art.

It will be apparent from the foregoing specification that the present invention makes possible the use of starch bearing materials of the character described which, due to aged or moldy conditions, are unfit for their normal consumption. Furthermore, by means of the present invention a binder is obtained which is not only more effective than heretofore known binders thereby requiring less quantities of it for a unit amount of briquettable fuel, but also the fact that there is required a substantially less amount of water than has heretofore been required in preparing starch binders results in a decreased manufacturing cost due to the lack of necessity of driving off large amounts of excess water from the briquettes. It will further be evident that by preparing the binder in advance of mixing it with the briquettable fuel, economies will be effected due to the fact that it is not necessary to agitate the entire briquette mixture for the full period of time necessary for the starch to be converted into a usable binder.

Having thus described my invention, what I desire to secure by Letters Patent and claim is:

1. The process of making solid fuel briquettes comprising the steps of heating under pressure at a temperature above 212 degrees Fahr. ground whole cereal in which the starch content is ungelatinized with water and sodium hydroxide, and simultaneously subjecting to a violent mixing and stirring agitation, the sodium hydroxide being in such proportion to the starchy content as to facilitate the rupturing of the starch granules, the water content being in such proportion to the other ingredients that at an intermediate stage of the cooking and mixing and stirring the mass becomes of heavy, thick, dough-like consistency and continued cooking and stirring results in substantial breakdown or rupturing of the starch granules and the conversion of a substantial portion of the starch into dextrin, and the mixture changes from such heavy, dough-like consistency to a transparent, amber-colored pourable fluid of sticky viscous consistency, adding such fluid in such consistency and while heated as a binder to briquettable solid fuel of approximate atmospheric dryness, mixing to distribute the binder and coat the fuel particles therewith, and molding with pressure into briquettes without the addition of added water to the briquettable mixture.

2. The process of making solid fuel briquettes comprising the steps of heating under pressure and at a temperature above 212 degrees Fahr. ground whole cereal in which the starch content is ungelatinized with water and sodium hydroxide, and simultaneously subjecting to a mixing and stirring agitation, the sodium hydroxide being in such proportion to the starchy content as to facilitate the rupturing of the starch granules, the water content being such in proportion to the other ingredients that the mass during the cooking and stirring first becomes of heavy, thick, dough-like consistency, and continued cooking and stirring results in substantial breakdown or rupturing of the starch granules and the conversion of a substantial portion of the starch into dextrin, and the mixture changes from such heavy, thick dough-like consistency to a pourable fluid of viscous sticky consistency, adding such fluid in such condition as a binder to a briquettable solid fuel, reducing to a briquettable stage, and forming into briquettes.

3. The process of making solid fuel briquettes comprising the steps of cooking under pressure ground whole cereal in which the starch content is ungelatinized with water and an alkali material, and simultaneously subjecting to a mixing and stirring agitation, the alkali material being in such proportion to the starchy content as to facilitate the rupturing of the starch granules, the water content being in such proportion to the other ingredients that the mass during the cooking and stirring first becomes of heavy, thick dough-like consistency, and continued cooking and stirring results in substantial breakdown or rupturing of the starch granules and the conversion of a substantial portion of the starch into dextrin, and the mixture changes from such heavy, thick dough-like consistency to a pourable fluid of viscous sticky consistency, adding such fluid in such condition as a binder to a briquettable solid fuel, mixing to distribute the binder and coat fuel particles therewith, and molding into briquettes without the addition of added water to the briquettable mixture, the moisture content of the briquettable mixture being such that substantially no water is squeezed from the mixture under molding pressure.

4. The process of making solid fuel briquettes comprising the steps of cooking under pressure ground whole cereal in which the starch content is ungelatinized with water and sodium hydroxide and vigorously mixing and stirring while cooking, the sodium hydroxide being in such proportion to the starchy content as to facilitate the rupturing of the starch granules, the water content being in such proportion to the other ingredients that at an intermediate stage of the cooking, mixing and stirring the mass becomes of a heavy, thick dough-like consistency, the cooking and mixing and stirring being continued after such dough-like condition until a substantial breakdown or rupturing of the starch granules results and a substantial portion of the starch is converted into dextrin, and the mixture changes from such heavy dough-like consistency to a substantially transparent pourable fluid of viscous consistency, adding such fluid in such condition as a binder to briquettable solid fuel, mixing to a briquettable state, and molding into briquettes.

5. The process of making solid fuel briquettes comprising the steps of heating under pressure and at a temperature above 212 degrees Fahr. ground whole cereal in which the starch content is ungelatinized with water and sodium hydroxide, and simultaneously subjecting to a violent mixing and stirring agitation, the sodium hydroxide being in approximately the proportion of two percent by weight of the ground whole cereal content when dry, the water content being about equal in volume to the whole ground cereal content when dry, the cooking and mixing and stirring being continued until the mass becomes of heavy, thick, dough-like consistency at an intermediate stage of the cooking and stirring, continued cooking and stirring resulting in substantial breakdown or rupturing of the starch granules and the conversion of a substantial portion of the starch into dextrin, and the mixture changes from such heavy, thick dough-like consistency to a pourable fluid of viscous, sticky consistency, adding such fluid in such condition as a binder to briquettable solid fuel, mixing to distribute the binder and coat the fuel particles therewith, and molding into briquettes.

6. The process of making solid fuel briquettes comprising the steps of heating under pressure and at a temperature exceeding 212 F. material containing a substantial proportion of starch and in which the starch is ungelatinized with water and an alkali material, and simultaneously subjecting to a vigorous mixing and stirring agitation, the alkali material being in such proportion to the starchy content as to facilitate the rupturing of the starch granules, the water content being in such proportion to the other ingredients that at an intermediate stage in the cooking and stirring and mixing the mass becomes of heavy thick dough-like consistency, and continued cooking and mixing and stirring resulting in the substantial breakdown or rupturing of the starch granules and the conversion of a substantial portion of the starch into dextrin, and the mixture changes from such heavy dough-like consistency to a pourable fluid of viscous, sticky consistency, adding such fluid while heated and in such consistency as a binder to briquettable solid fuel of atmospheric dryness, mixing to a briquettable state without additional water being added, and forming into briquettes.

7. The process of making solid fuel briquettes comprising the steps of cooking under pressure an ungelatinized starchy material with water and sodium hydroxide, and simultaneously subjecting to vigorous stirring and mixing, the sodium hydroxide being approximately two percent by weight of the starchy material, the water being of such proportion to the starchy material that the mixture at an intermediate stage of the cooking and mixing and stirring becomes of heavy, thick dough-like consistency, and further cooking and stirring and mixing results in substantial breakdown or rupturing of the starch granules and the conversion of a substantial portion of the starch into dextrin, and the mixture changes from such heavy dough-like consistency to a pourable fluid of sticky viscous consistency, adding such fluid while heated and in such pourable fluid condition as a binder to a briquettable solid fuel, mixing to a briquettable state, and molding into briquettes, the water content of the briquettable mixture being such that substantially no water is squeezed from the mixture under molding pressure.

JOHN A. ERICKSON.